United States Patent Office.

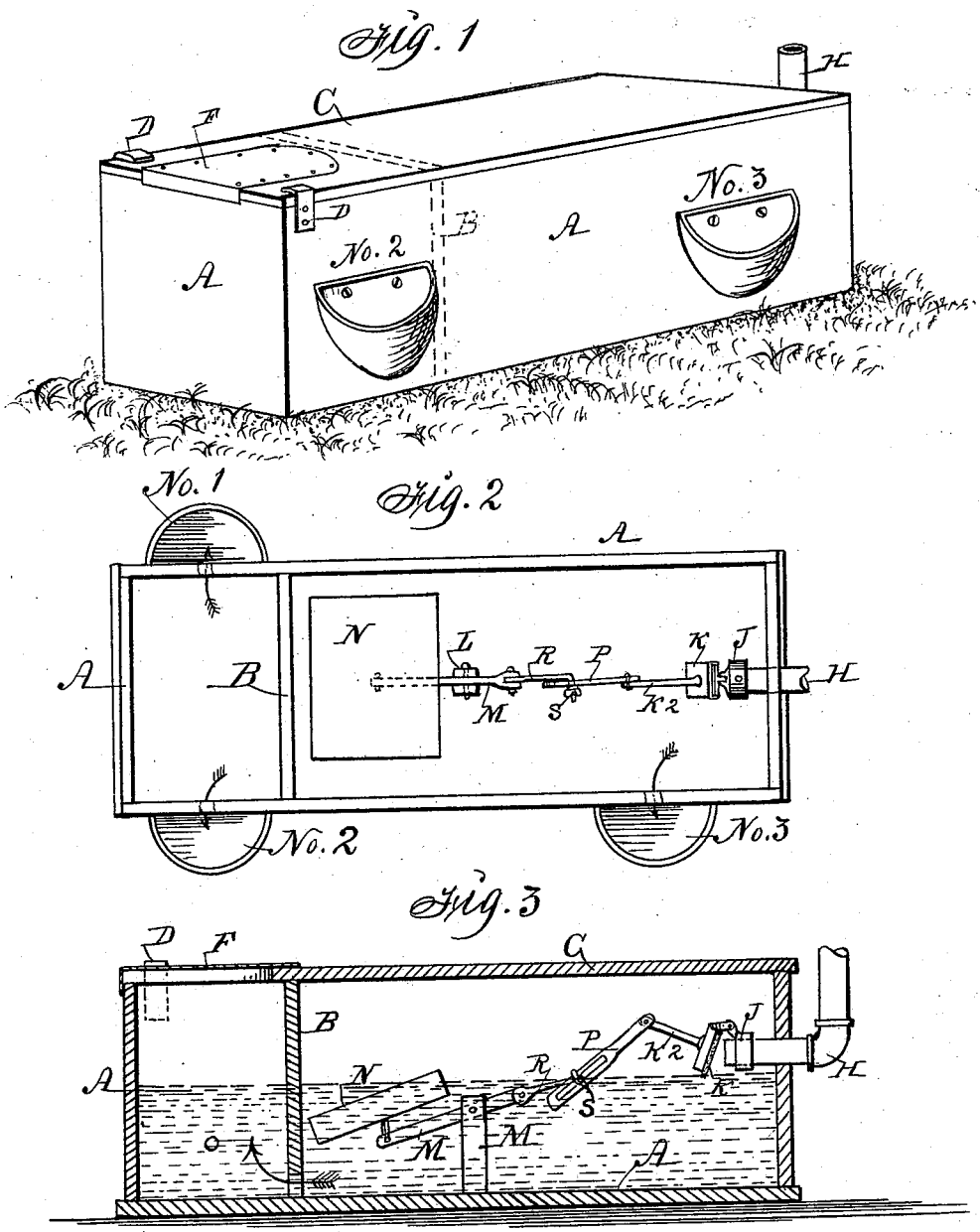

HIRAM E. PURDY, OF ROCKWELL CITY, IOWA.

AUTOMATIC HOG-WATERING TROUGH.

SPECIFICATION forming part of Letters Patent No. 506,253, dated October 10, 1893.

Application filed March 20, 1893. Serial No. 466,819. (No model.)

*To all whom it may concern:*

Be it known that I, HIRAM E. PURDY, a citizen of the United States of America, residing at Rockwell City, in the county of Calhoun and State of Iowa, have invented an Improved Automatic Hog-Watering Trough, of which the following is a specification.

My object is to provide a trough adapted to be successfully used in summer and winter and provided with means that can be readily adjusted as required to regulate the flow of water into the trough, and my invention consists in the construction and combination of valve-operating mechanism, and a cover, with a trough, as hereinafter set forth, pointed out in my claim and illustrated in the accompanying drawings in which—

Figure 1 is a perspective view showing the trough in position and an uncovered opening in its top as required for use when water freezes. Fig. 2 shows the trough uncovered and a top view of the operative mechanism connected therewith. Fig. 3 is a longitudinal section of the trough showing the relative positions of the adjustable parts of the valve-operating mechanism connected with the trough.

The reference letter A represents an oblong trough that may vary in dimensions as desired.

B is a partition, near one end of the trough, that extends from the top to near the bottom in such a manner that water admitted at the other end of the trough can pass through underneath the partition.

C is a removable cover adapted to be detachably fixed on top of the trough by means of screws and angle irons D fixed to the sides of the trough as shown in Fig. 3.

F is a detachable plate fitted and fixed on top of the cover C to close an opening of corresponding shape in the end portion of the cover C in such a manner that it can be readily removed in winter time to allow animals access to water in the end portion of the trough.

1, 2, and 3 are water cups, preferably cast metal, fixed against the outside of the trough and over perforations in the trough that allow water to flow from the trough into the cups so that animals can drink water from the cups.

H is a tube fixed in the end of the trough to convey water from any suitable source of supply into the trough.

J is a collar detachably fixed to the inner open end of the tube H and provided with an integral upward projection adapted for hinging a valve K thereto.

K² is a valve stem projecting at right angles from the valve.

L is a post fixed to the bottom of the trough to serve as a fulcrum for a lever M that is pivotally connected with the top of the post.

N is a float pivotally connected with one end of the lever M.

P is a bridle pivotally connected with the end of the valve stem K², at one of its ends, and adjustably and detachably connected with the end of the lever M by means of a link R that is pivoted to the end of the lever M and detachably and adjustably connected at its other end with the bridle P. The end of the link is bent at right angles and screw-threaded and extended through the bridle and clamped fast to the bridle at any point desirable by means of a winged nut S placed on the screw-threaded end of the link.

In practical use when water flows into the trough through the tube H and rises up against the float it will lift the float and thereby actuate the lever M as required to close the valve K and check the flow of water and restrict it from rising within the trough above any predetermined point so that the supply admitted into the cups on the outside of the trough can be regulated and waste of water prevented.

In winter when water freezes the valve operating mechanism can be readily removed, or the valve retained in an open position, and the plate F removed from over the opening in the end of the cover C so that animals can drink from the fountain thus produced by means of the trough having the partition B and cover C provided with an opening in its end.

I claim as my invention—

An automatic hog-watering trough comprising a trough having a fixed partition near one end, and an opening in the lower part of the partition, a removable cover having an opening in one end and a plate detachably fixed over said opening, water cups fixed to the outside of the trough, a supply pipe in the end of the trough, a collar on the end of the pipe, a valve hinged to the collar and provided with a stem extending at right angles therefrom, a lever fulcrumed within the trough, a float at one end of the lever, a link having a screw-threaded end bent at right angles and extended through a bridle and a nut on the end of the link, and the bridle pivotally connected with the stem of the valve, all arranged and combined to operate in the manner set forth for the purposes stated.

HIRAM E. PURDY.

Witnesses:
W. E. GRAY,
F. H. STAFFORD.